(12) United States Patent
Graham

(10) Patent No.: US 6,473,252 B1
(45) Date of Patent: Oct. 29, 2002

(54) BIPHASIC MULTIPLE LEVEL STORAGE METHOD

(75) Inventor: Martin H. Graham, Berkeley, CA (US)

(73) Assignee: And Yet, Inc., Berkeley, CA (US)

( * ) Notice: Subject to any disclaimer, the term of this patent is extended or adjusted under 35 U.S.C. 154(b) by 0 days.

(21) Appl. No.: 09/293,136

(22) Filed: Apr. 16, 1999

Related U.S. Application Data

(63) Continuation-in-part of application No. 09/221,291, filed on Dec. 23, 1998.

(51) Int. Cl.[7] .................................................. G11B 5/09
(52) U.S. Cl. ........................................................ 360/40
(58) Field of Search ..................... 360/39, 40; 375/238, 375/239

(56) References Cited

U.S. PATENT DOCUMENTS

| | | |
|---|---|---|
| 3,863,025 A | 1/1975 | Gonsewski et al. |
| 3,968,328 A | 7/1976 | Tsuchiya et al. |
| 4,337,457 A | 6/1982 | Tache |
| 4,387,294 A | 6/1983 | Nakamura et al. |
| 4,410,877 A | 10/1983 | Carasso et al. |
| 4,556,868 A | 12/1985 | Härle |
| 4,617,553 A | 10/1986 | Webster et al. |
| 5,144,469 A | 9/1992 | Brahms et al. |
| 5,148,144 A | 9/1992 | Sutterlin et al. |
| 5,533,050 A | 7/1996 | Isard et al. |
| 5,568,517 A | 10/1996 | Sogo et al. |
| 5,594,344 A | 1/1997 | Doyle et al. |
| 5,600,499 A * | 2/1997 | Acosta et al. ................. 360/40 |
| 5,627,482 A | 5/1997 | Lamatsch |
| 5,640,112 A | 6/1997 | Goto et al. |
| 5,640,160 A | 6/1997 | Miwa |
| 5,696,790 A | 12/1997 | Graham et al. |
| 5,812,597 A | 9/1998 | Graham et al. |
| 6,028,540 A * | 2/2000 | Graham ........................ 341/72 |
| 6,031,472 A * | 2/2000 | Johnson et al. ............... 341/58 |
| 6,212,230 B1 | 4/2001 | Rybicki et al. |

OTHER PUBLICATIONS

*Digital Communication*, 2nd Edition, Edward A. Lee and David G. Messerschmitt, Aug. 1993, pp. 558–560, 564–565, 568, 571, 604, 607–608.

"PCM Transmission in the Exchange Plant," M.R. Aaron, *The Bell System Technical Journal*, vol. XLI, No. 1, Jan. 1962, pp. 99–141.

"Digital Transmission in the Presence of Impulsive Noise," J.S. Engel, *The Bell System Technical Journal*, vol. XLIV, No. 8, Oct. 1965, pp. 1699–1743.

"A Bipolar Repeater for Pulse Code Modulation Signals," J.S. Mayo, *The Bell System Technical Journal*, vol. XLI, No. 1, Jan. 1962, pp. 25–97.

"Certain Topics in Telegraph Transmission Theory," *Transactions of the American Institute of Electrical Engineers*, vol. 47, No. 2, Apr. 1928, pp. 617–644.

"Bits And Pots Together," M. Graham, Electronics Research Laboratory, College of Engineering, University of California, Berkeley, CA 94720, *Memorandum No. UCB/ERL M97/45*, Jul. 28, 1997, pp. 1–10.

White, Robert M., "Chapter 4—The Writing Process," pps. 31–38; "Chapter 5—The Readback Voltage," pps. 39–49; "Chapter 7—The Recording Channel," pps. 57–60; *Introduction to Magnetic Recording*, (1985).

Jorgensen, Finn, "Chapter 8—Fields From Magnetic Heads," *The Complete Handbook of Magnetic Recording*, 4th Edition, pps. 197–224 (1985).

\* cited by examiner

*Primary Examiner*—Alan T. Faber
(74) *Attorney, Agent, or Firm*—Blakely, Sokoloff, Taylor & Zafman LLP

(57) ABSTRACT

A novel magnetic data storage method is disclosed for storing digital data in a magnetic medium. According to the present invention, the digital data is represented by the interval between two consecutive biphasic magnetic pulses recorded in the magnetic medium. In addition, additional data can be encoded in the pulse width of each biphasic magnetic pulse so that higher data encoding ratio can be achieved.

14 Claims, 14 Drawing Sheets

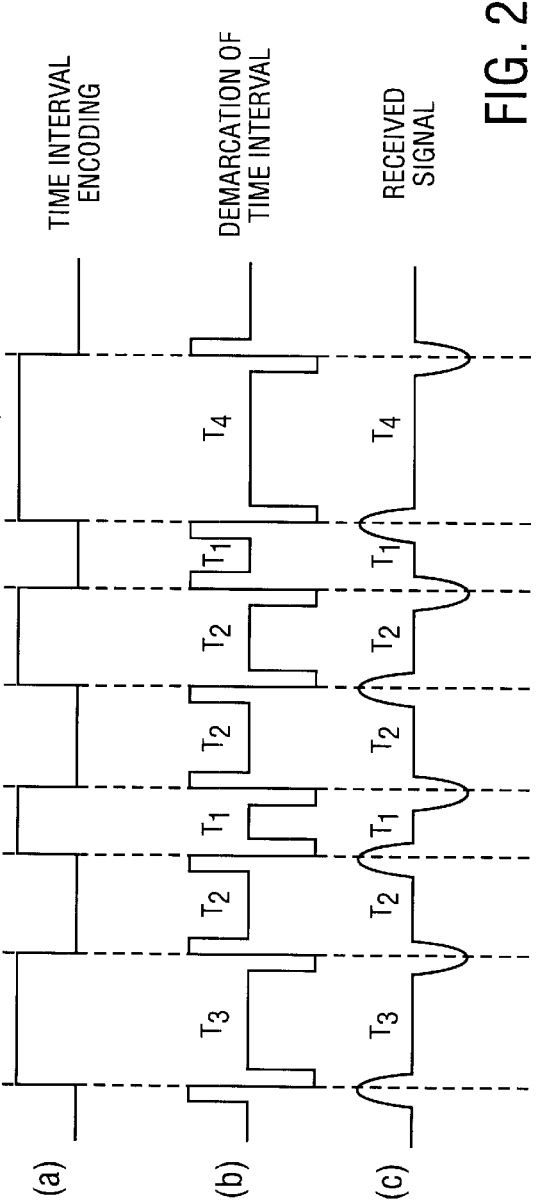

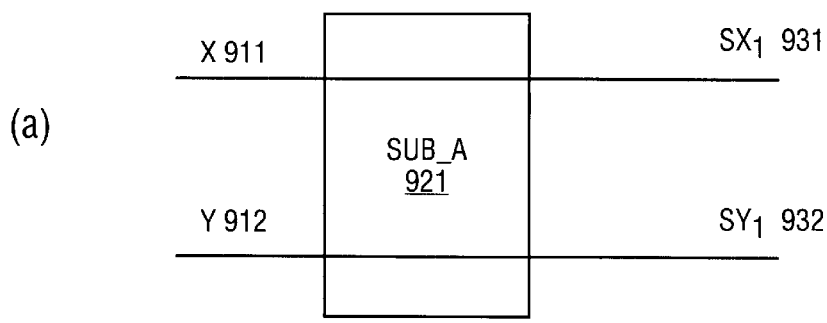
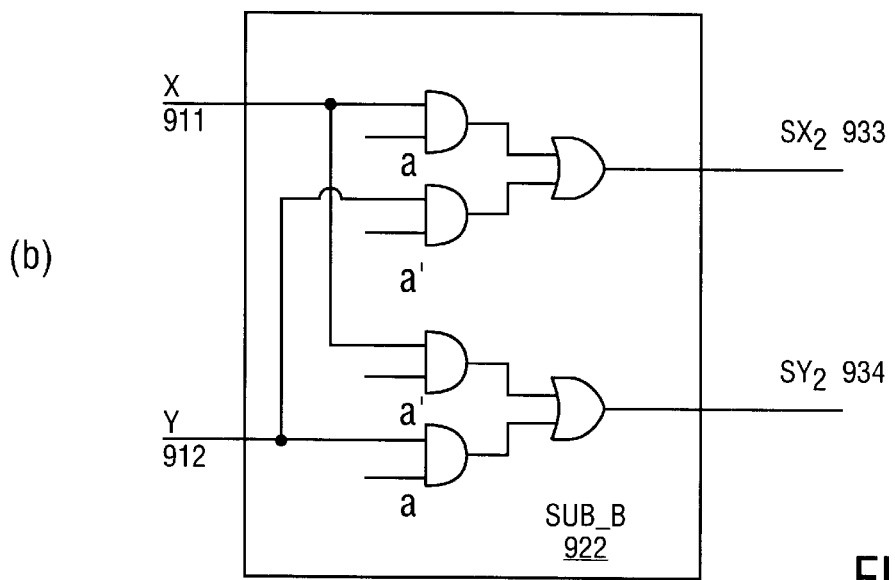
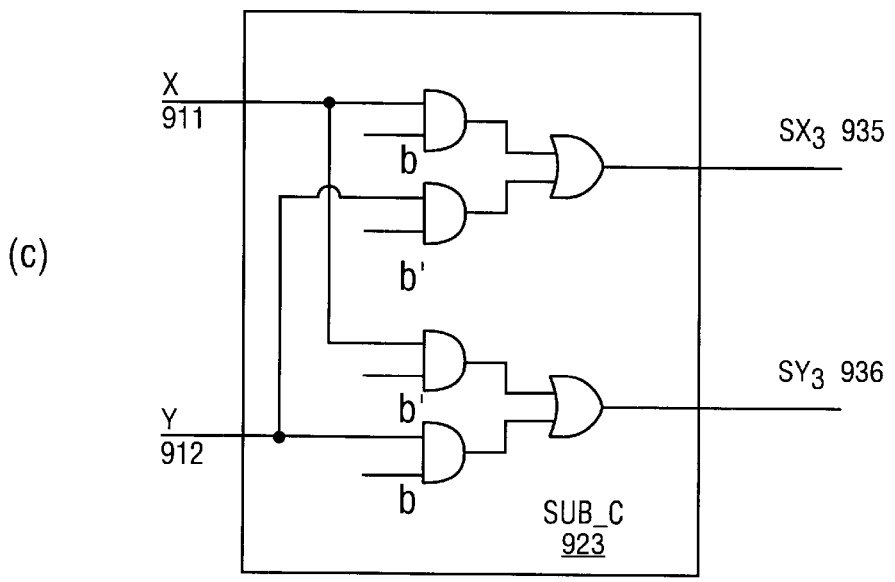
FIG. 10

BIPHASIC MULTIPLE LEVEL STORAGE METHOD

CROSS-REFERENCE TO RELATED APPLICATION

This is a continuation-in-part of application Ser. No. 09/221,291, filed Dec. 23, 1998.

BACKGROUND OF THE INVENTION

The present invention relates to the field of encoding and decoding digital data in a magnetic recording medium.

U.S. Pat. No. 5,696,790 issued to Graham et al. (the '790 patent) discloses a data transmission method where data is transmitted by two states using a first signal having a first duration to represent one digital state and a second signal having a second duration different than the first duration to represent a second digital state. The '790 patent is hereby incorporated by reference in its entirety.

The '790 patent is directed to a communication system used in a local area network using traditional phone wiring. For example, telephone wiring comprising twisted pair lines are used to connect a central office to various office locations using single wiring connections. The method disclosed in the '790 patent allows computers and/or printers to operate in a network environment independently and transparently to the operation of ordinary telephone service while sharing the same set of twisted pair lines.

One problem facing the transmission method disclosed in the '790 patent is the DC component incurred to the transmission line because of the difference in lengths of the first signals and the second signals. This DC component affects normal operation of the telephone line.

Another problem facing the '790 patent is the possible bandwidth collisions between the bandwidth used in the '790 patent and the bandwidth for the DSL transmission which currently uses the same transmission line. In some instances, the bandwidth used in the transmission method disclosed in the '790 patent overlaps the bandwidth of the DSL transmission and/or regular telephone transmission frequency band. Therefore, it is desirable to have another form of data communication method using the traditional phone wiring while not colliding with the regular telephone signals and the DSL signals.

SUMMARY OF THE INVENTION

It is therefore an object of the present invention to provide a method of transmitting data using traditional phone wiring.

It is another object of the present invention to provide a communication method that is able to transmit data alongside with the normal telephone service using traditional phone wiring.

It is a further object of the present invention to provide a low cost transmitter and receiver for implementing the above-mentioned transmission method.

It is a further object of the present invention to provide a novel method of storing digital data in a magnetic medium.

The preferred embodiment of the data transmission method and/or data storage method according to the present invention employs a biphasic marking system. In the present invention, data is encoded in the time interval between each two consecutive biphasic pulses. Furthermore, under another aspect of the present invention, additional data can be encoded by the amplitudes, or pulse widths, of the biphasic pulses transmitted.

Additional objects, features and advantages of various aspects of the present invention will become apparent from the following description of its preferred embodiments, which description should be taken in conjunction with the accompanying drawings.

BRIEF DESCRIPTION OF THE DRAWINGS

FIG. 1 is a conversion table showing a binary data encoding method according to the present invention.

FIG. 2 is a timing diagram showing different waveforms employing different encoding schemes according to the present invention.

FIG. 10 shows the three subcircuits of the pulse generator as shown in FIG. 9.

DETAILED DESCRIPTION OF THE DRAWINGS

Figure 3:
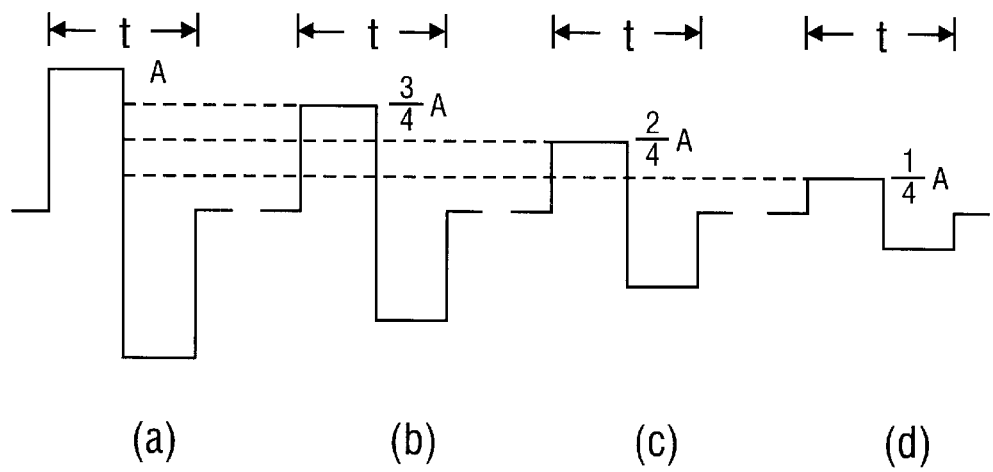
FIG. 3 shows four biphasic pulses each representing a different encoding state using the amplitude encoding method according to the present invention.

FIG. 1 is a conversion table showing a binary data encoding method using time interval encoding.

Referring to FIG. 1, four groups of data each having two bits are encoded as the four encoding states (i.e. T1, T2, T3, and T4). The first encoding state T1 represents two bits of binary data ("00") occupying a time interval of 2 units (e.g. 2 microseconds). The second encoding state T2 represents another two bits of binary data ("01") occupying a time interval of 3 units (e.g. 3 microseconds). The third encoding state T3 represents yet another two bits of binary data ("10") occupying a time interval of 4 units (e.g. 4 microseconds).

Finally, the fourth encoding state T3 represents another two bits of binary data ("11") occupying a time interval of 5 units (e.g. 5 microseconds). It should be noted that the present invention is not limited to the above-mentioned encoding details. Other sets of encoding details such as using different time intervals for representing different states can be implemented similarly. Furthermore, other numbers of states (e.g. 2, 3, 5, 6, or 7 . . . ) can also be implemented also.

FIG. 2 is a timing diagram showing two waveforms (i.e. (a) and (b)) employing two different encoding methods for representing a digital bit stream comprising the sequence of T3 T2 T1 T2 T2 T1 T4 . . . (i.e. 10 01 00 01 01 00 11).

Waveform (a) as shown in FIG. 2 represents the above-mentioned bit stream using the time interval encoding method as disclosed in the '790 patent. As shown in the figure, waveform (a) comprises a waveform oscillating between two signal levels (i.e. "H" and "L"). Data is encoded in each time duration of each signal level ("H" and "L") according to the conversion table as shown in FIG. 1.

Waveform (b) represents the same bit stream as encoded in the waveform (a) using an encoding method according to one aspect of the present invention. In this encoding method, data is encoded by the demarcation of the time interval using biphasic pulses as the marking signals. Specifically, the demarcation of time encoding method is an improvement over the time interval encoding method as shown in waveform (a). Under this aspect of the present invention, instead of maintaining the signal level in one of the two digital levels as shown in waveform (a), the demarcation of time interval encoding method generates biphasic pulse as "marking signal" for indicating each voltage transition (i.e. "H" to "L", or "L" or "H") in waveform (a). As shown in the figure, each marking signal in waveform (b) signals a corresponding to a voltage transition in waveform (a).

It should be noted that even though biphasic pulses are used as the marking signals under this aspect of the present invention, any marking signals can be employed. Preferably, any marking signal having no DC component can be used for marking each voltage transition of waveform (a). Under the present invention, a biphasic pulse is a pulse comprising two different phase components. For example, as shown in waveform (b), each biphasic pulse comprises a positive pulse and a negative pulse generated in sequence. These two pulses combined form a basic biphasic pulse. By having two appositive phase components in each biphasic pulse, each biphasic pulse carries no DC component.

Under this preferred embodiment of the present invention, when a positive pulse precedes a negative pulse, it is defined as an odd type. On the other hand, when a negative pulse precedes a positive pulse, it is defined as an even type. In the example as shown in waveform (b), the 1st, 3rd, 5th, and 7th pulses belong to the even type. And the 2nd, 4th, 6th, and 8th pulses belong to the odd type.

It is true that the same type of biphasic pulse (i.e. either odd or even) can be used in waveform (b) to encode the entire digital bit stream. In that case, each voltage transition as shown in waveform (a) will be marked by only one type of biphasic pulses (either even or odd). However, waveform (b) illustrates another aspect of the present invention. Under this aspect of the present invention, waveform (b) employs an alternate assignment of even and odd types of biphasic pulses in the encoded bit stream. This method is called alternate mark inversion ("AMI"). The alternate mark inversion method alternates the type of each consecutive biphasic pulses (e.g. odd even odd even etc.) so that each biphasic pulse is of a different type from its immediate neighbors (i.e. before and after). Thus, in the example as shown in waveform (b), each odd type biphasic pulse represents a voltage transition from "L" to "H" in waveform (a), whereas each even type biphasic pulse represents a voltage transition from "H" to "L" in waveform (a). The reason of employing AMI is to reduce interference between consecutive biphasic pulses so that the signals received can be recovered easily.

Waveform (c) represents the signal received after the biphasic pulse chain as shown in waveform (b) is transmitted over 12,000 feet of unshield twisted pair (conventionally called "Build Out"). By comparing waveform (b) and waveform (c), it can be noted that for each odd type biphasic pulse sent, a positive pulse is received at the receiving end. And for each even biphasic pulse sent, a negative pulse is received at the receiving end. Therefore, by measuring the time interval (or time delay) between each two consecutive pulses of waveform (c) at the receiving end, the original data can be recovered by decoding the time delay in between.

Another aspect of the present invention is to increase the encoding capacity by further encoding the biphasic pulse chain already encoded by the demarcation of time interval encoding method as shown in waveform (b). According to this aspect of the present invention, each of the biphasic pulse is further encoded by encoding additional data in its amplitude. By dividing the amplitude of each biphasic pulse into a plurality of voltage levels, each biphasic pulse can carry at least one additional bit of data. For example, by dividing the amplitude of each biphasic pulse into four levels, two additional bits of data can be transmitted by each biphasic pulse.

Similarly, according to another aspect of the present invention, each of the biphasic pulses can be further encoded by encoding data in its pulse width (instead of encoding data in the amplitude as discussed in the previous paragraph). According to this aspect of the present invention, each of the biphasic pulse is further encoded by encoding additional data in its pulse width. By dividing the pulse width of each biphasic pulse into a plurality of lengths, each biphasic pulse can also carry one additional bit of data. For example, by dividing the pulse width of each biphasic pulse into four time lengths, two additional bits of data can be transmitted by each biphasic pulse.

However, it should be noted that since the received signals of both of the above-mentioned two additional encoding methods (i.e. biphasic pulse amplitude encoding, and biphasic pulse width encoding) are very similar, only one of the two encoding methods should be combined with the demarcation of time interval encoding method as shown in waveform (b) of FIG. 2.

FIG. 3 shows four biphasic pulses each representing a different encoding state using the amplitude encoding method according to the present invention. Pulse (a) shows a biphasic pulse having an amplitude of 4A/4 which represents a first state. Pulse (b) shows a biphasic pulse having an amplitude of 3A/4 which represents a second state. Pulse (c) shows a biphasic pulse having an amplitude of 2A/4 which represents a third state. Finally, pulse (d) shows a biphasic pulse having an amplitude of A/4 which represents a fourth state. Thus, because of the division of the amplitude of each biphasic into four independent states, each biphasic pulse in this example represents two bits of data (i.e. 00, 01, 10, or 11).

As described in the previous paragraphs, this amplitude encoding method can be implemented and combined with the demarcation of time interval encoding method as illustrated in waveform (b) of FIG. 2. Therefore, for each of the two consecutive biphasic pulses in the biphasic pulse chain, two sets of data value are simultaneously encoded by two different encoding methods. That is, one set of data value is being encoded in the time interval between two consecutive biphasic pulses, and another set of data value is being encoded in the amplitude of each biphasic pulse in the biphasic pulse chain.

Figure 4:
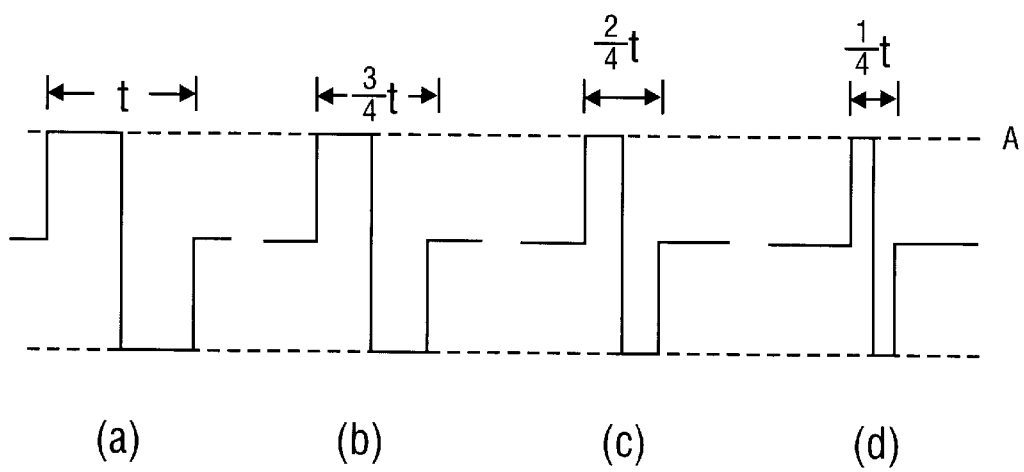
FIG. 4 shows four biphasic pulses each representing a different encoding state using the pulse width encoding method according to the present invention.

FIG. 4 shows four different biphasic pulses each representing a different encoding state using the pulse width encoding method according to the present invention. As shown in the figure, pulse (a) shows a biphasic pulse having a pulse width of 4t/4 which represents a first state. Pulse (b) shows a biphasic pulse having a pulse width of 3t/4 which represents a second state. Pulse (c) shows a biphasic pulse having a pulse width of 2t/4 which represents a third state. Finally, pulse (d) shows a biphasic pulse having a pulse width of t/4 which represents a fourth state. In the example as shown, because of the division of the pulse width of each biphasic pulse in the biphasic pulse chain into four independent states, each biphasic pulse under this aspect of the present invention can be encoded with two additional bits of data (i.e. 00, 01, 10, and 11).

It should be noted that the above-mentioned two additional encoding methods (i.e. amplitude encoding and pulse width encoding) are used in addition to the demarcation of time interval encoding method as shown in waveform (b) of FIG. 2. By combining any of these two additional encoding methods with the demarcation of time interval encoding method, two sets of data can be encoded in one sequence of biphasic pulses. That is, between every two consecutive biphasic pulses, not only the time interval between the two biphasic pulses represents one set of data, the amplitude or pulse width of each biphasic pulse also represents the second set of data value.

Figure 5:
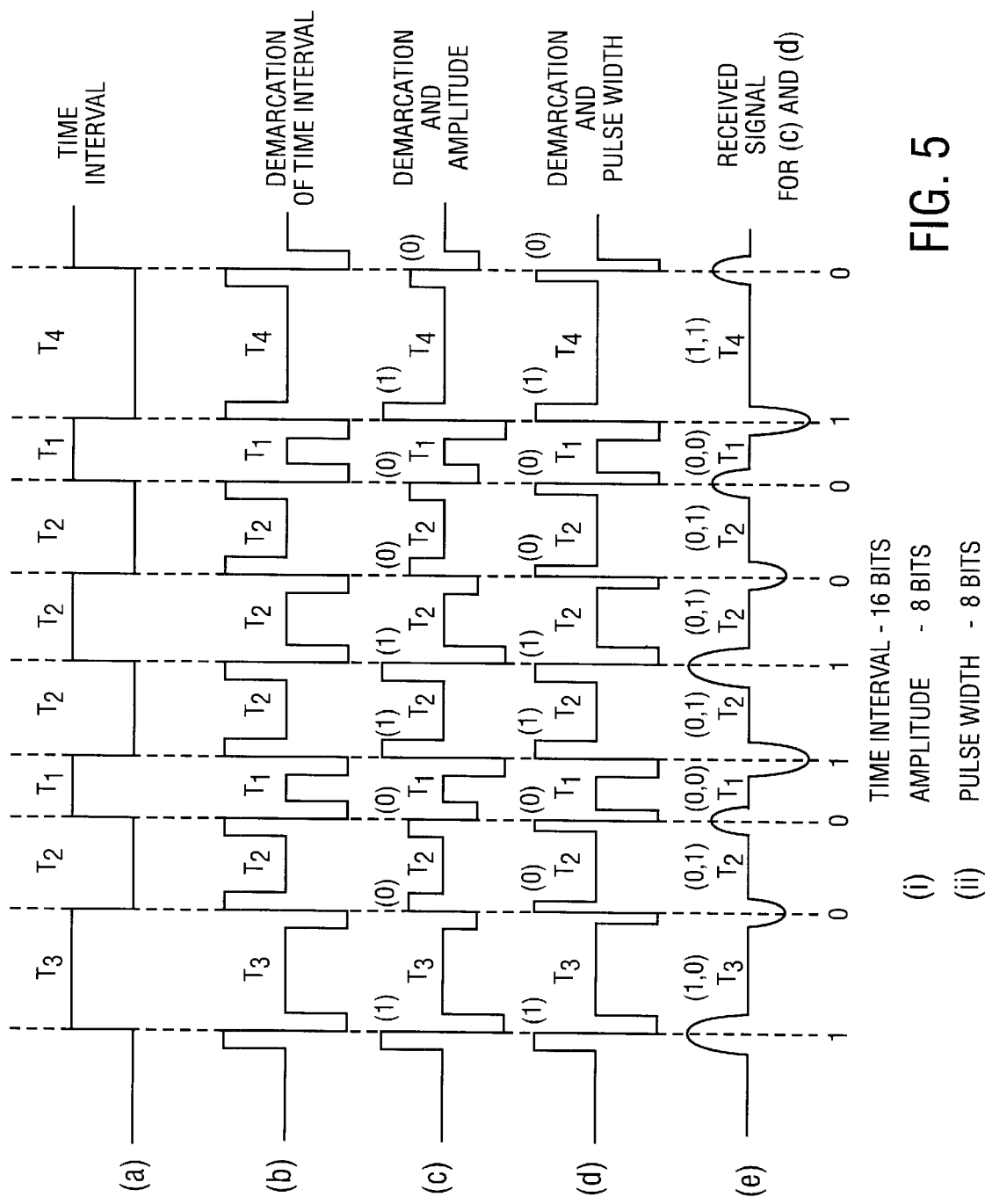
FIG. 5 is a timing diagram showing five waveforms employing different encoding schemes according to the present invention.

FIG. 5 is a timing diagram showing waveforms encoded with data using different encoding methods. For the illustration and explanation purposes, waveform (a) and waveform (b) are both encoded with a same first set of digital bit stream comprising T3 T2 T1 T2 T2 T2 T1 T4. Waveform (c) and (d) are also encoded with this sequence of digital bit stream. However, with the additional encoding with a second set of digital bit stream comprising 1 0 0 1 1 0 0 1 0 using either the amplitude encoding (i.e. waveform (c)) or the pulse width encoding (i.e. waveform (d)). Waveform (e) shows the signals received at the receiving end of a Build Out for the waveforms (c) and (d) sent at the sending end.

Specifically, waveform (a) is a waveform encoded with the time interval encoding method. Under this encoding method, the time interval between two consecutive voltage transitions represents one set of data bits. In this example, the data is encoded under the four state encoding as described in FIG. 1. The first state T1 represents "00", and is encoded by a time interval of 2 units. The second T2 represents "01", and is encoded by a time interval of 3 units. The third state T3 represents "10", and is encoded by a time interval of 4 units. And, the fourth state T4 represents "11", and is encoded by a time interval of 5 units. Thus, waveform (a) represents the following sequence of data: 10 01 00 01 01 01 00 11 (i.e. T3 T2 T1 T2 T2 T2 T1 T4).

Waveform (b) is a waveform representing the identical sequence of data as in waveform (a) by encoding the data with the demarcation of time interval encoding method according to the present invention. It should be noted that even thought waveform (b) shows an AMI as described, the present invention is not limited to AMI and same type of biphasic pulses can be used for the entire biphasic pulse chain. Under this encoding method, each time interval between two consecutive marking signals represents one group of data bits. In this example, each biphasic pulse in waveform (b) represents a voltage transition occurred in waveform (a). Thus the encoding table using for encoding data in waveform (b) is identical to the table used in waveform (a) (i.e. FIG. 1). Specifically, this encoding method employs the 4-state encoding as described in FIG. 1 by using a biphasic pulse to mark each voltage transition as shown in waveform (a). Thus, similar to the time interval encoding method as shown in waveform (a), the sequence of data represented in waveform (b) is: 10 01 00 01 01 01 01 00 11 (i.e. T3 T2 T1 T2 T2 T2 T1 T4).

Waveform (c) is a waveform representing another sequence of data using a combination of the demarcation of time interval encoding and amplitude encoding method according to the present invention. Under this encoding method, two encoding methods are combined to produce a higher encoding ratio. Thus, the new sequence of data comprises two set of data. This is, a first set of data identical to the data encoded in either waveforms (a) and (b), and a second set of data that is entirely new. Therefore, according to this method, the first set of data is encoded with the demarcation of time interval encoding method identical to waveform (b) so that each time interval between two consecutive marking signals represents one group of data bits. In addition, as shown in waveform (c), the amplitude of each biphasic pulse is also encoded using the amplitude encoding method. Particularly, in the present example, a two-state amplitude encoding is employed. Thus, the amplitude of each biphasic pulse represents one additional bit of data (in the present example, "H" for "1", and "L" for "0"). In the waveform as shown, an additional sequence of data bits is encoded in the amplitude of eight biphasic pulses as shown. The additional sequence of data bits of 0 0 1 1 0 0 1 0 is encoded in the amplitudes of the eight biphasic pulses as shown. By combining these eight bits of amplitude encoded data (i.e. 0 0 1 1 0 0 1 0) with the sixteen bits of time interval encoded data (i.e. 10 01 00 01 01 01 00 11), a total of 24 bits of data bits are encoded in the sequence as shown in waveform (c). As a result, by merging these two sequence of data bits encoded, the combined data bits encoded in waveform (c) is: 10 0 01 0 00 1 01 1 01 0 01 0 00 1 11 0.

Waveform (d) is a waveform directed to another aspect of the present invention which encodes data using a combination of the demarcation of time interval encoding and biphasic pulse width encoding method. Under this aspect of the present invention, instead of encoding the data in the amplitude of each biphasic pulse as in waveform (c), this method encodes additional bit(s) of data in the pulse width of each biphasic pulse. For example, as shown in waveform (d), a two-state pulse width encoding is implemented. For the example as shown, a wider pulse width represents a "1", whereas a narrower pulse width represents a "0". By combining the pulse width encoding with the demarcation of time interval encoding, the encoded sequence of data of waveform (d) comprises two groups of data as with waveform (c). The differences of the encoding methods between waveforms (d) and (c) are, in waveform (d), the second group of data is encoded in the pulse widths of the biphasic pulses instead of encoded in the amplitudes of the biphasic pulses in waveform (c). Thus, in the example as shown in waveform (d), the same sequence of data bits as in waveform (c) is encoded: 10 0 01 0 00 1 01 1 01 0 01 0 00 1 11.

Waveform (e) is a waveform showing the received signals at the receiving end of a Build Out after transmitting the signals of waveform (c) and waveform (d) over a long twisted wiring of over 12,000 feet. It should be noted that, for both encoding methods of (1) the combination of demarcation of time interval and amplitude encoding method (i.e. waveform (c); and (2) the combination of demarcation of time interval and pulse width encoding method (i.e. waveform (d)), the received signals of sequence of biphasic pulses transmitting over the Build Out are substantially similar and are shown as waveform (e).

Figure 6:
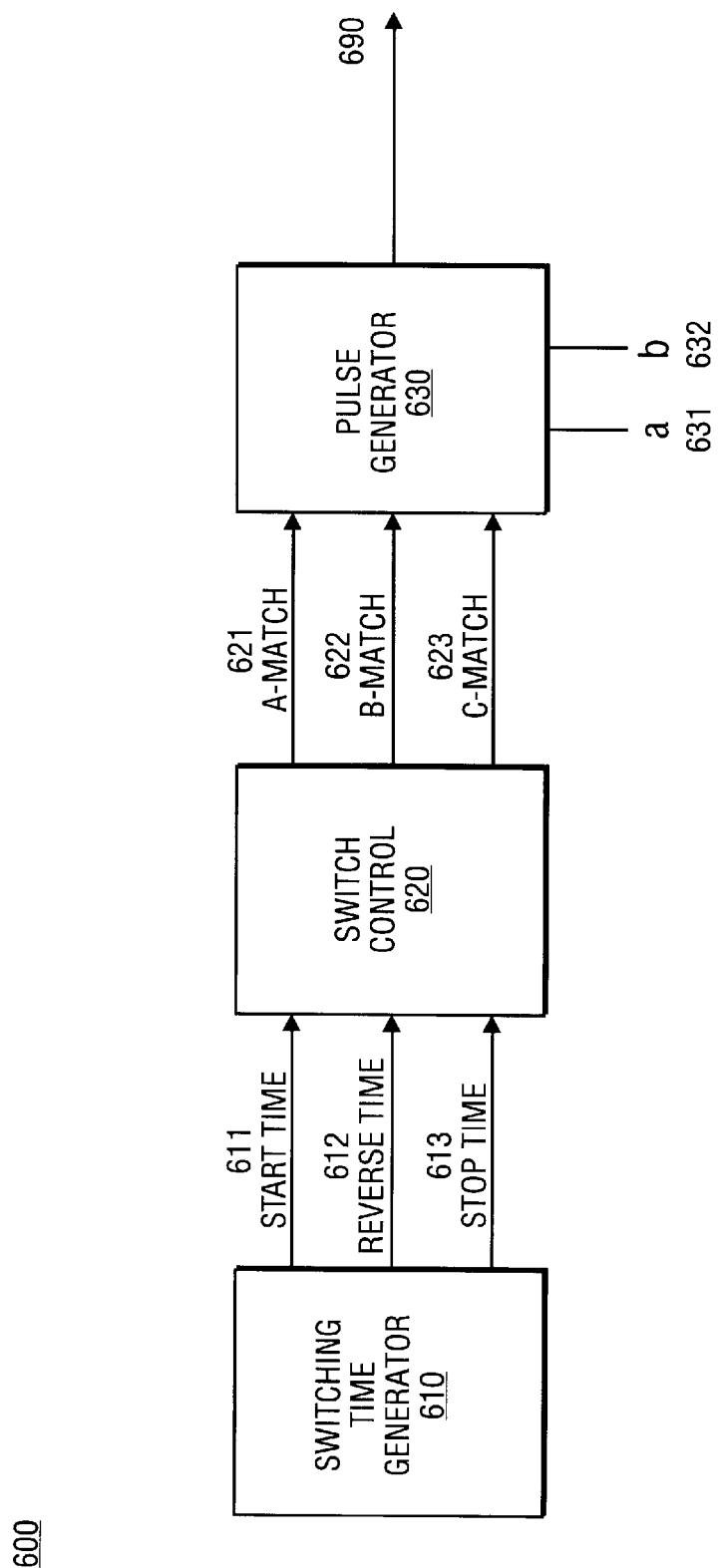
FIG. 6 shows a block diagram of an encoder used for encoding bit stream of data using either (1) a combination of the demarcation of time interval encoding and pulse width encoding method; or (2) a combination of the demarcation of time interval encoding and amplitude encoding method according to the present invention.

FIG. 6 shows a block diagram of a preferred embodiment of an encoder 600 used for encoding the bit stream of data for the encoding methods of (1) the combination of the demarcation of time interval and pulse with encoding; and (2) the combination of the demarcation of time interval and amplitude encoding.

The preferred embodiment as shown in FIG. 6 comprises three basic components: a switching time generator 610 for providing three set of timing signals 611,612,613 each indicating a voltage switching in a biphasic pulse; a switch control 620 for providing a set of three pulse signals 621,622,623 indicating three different switching times; and a pulse generator 630, in response to the three different switching times 621,622,623, for generating biphasic pulses 690.

As shown in the figure, the switching time generator 610 generates three timing signals: start time 611, reverse time 612, and stop time 613. In this preferred embodiment, the start time 611 indicates the beginning of a biphasic pulse (i.e. rising edge for an odd type, and trailing edge fr an odd type). The reverse time 612 indicates the voltage transition of a biphasic pulse (i.e. from "H" to "L" for an odd type, and from "L" to "H" for an even type). The stop time 613 indicates the end of a biphasic pulse (i.e. trailing edge for an odd type, and rising edge for an even type). In the preferred embodiment, these timing signals (i.e. start time 611, reverse time 612, and stop time 613) are binary numbers.

For the pulse width encoding method, therefore, by changing these three signals 611,612,613 according to a predefined scheme, the pulse width of each biphasic pulse can be controlled. Thus, multi-state data encoding can be implemented in the pulse width of each biphasic pulse.

On the other hand, for the amplitude encoding method, these three timing signals 611,612,613 are pre-fixed so that each voltage transition is fixed at a specific time instance.

As shown in the figure, these three timing signals 611, 612,613 are provided to the switch control 620. The switch control 620 coverts the three timing signals 611,612,613 into three pulse match signals 621,622,623. Each of these three match signals 621,622,623 indicates the appropriate clock cycle of a biphasic pulse (i.e. A-match 621, B-match 622 and C-match 623). These three match signals 621,622,623 are used by the pulse generator 630 to generate the biphasic pulses. For a biphasic pulse having a pulse width of 8 clock cycles, for example, the A-match signal 621 is raised "H" on the first clock cycle to signal the start time. Then, the B-match signal 622 is raised high on the fifth clock cycle to indicate the reverse time. Finally, the C-match signal 623 is raised "H" on the ninth clock cycle to indicate the stop time.

The three pulse signals (i.e. A-match 621, B-match 622, and C-match 623) are then provided to a pulse generator 630 for driving an output line 690. In the preferred embodiment as shown, the pulse generator 630 is further provided with two amplitude bits (i.e. a 631 and b 632) for encoding the amplitude of each biphasic pulse. In this example, four-state amplitude encoding is performed because of having two amplitude control signals a 631,b 632 (i.e. 00, 01, 10, 11). It should also be noted that, for the pulse width modulation, these two amplitude bits a 631, b 632 are not used.

Figure 7:
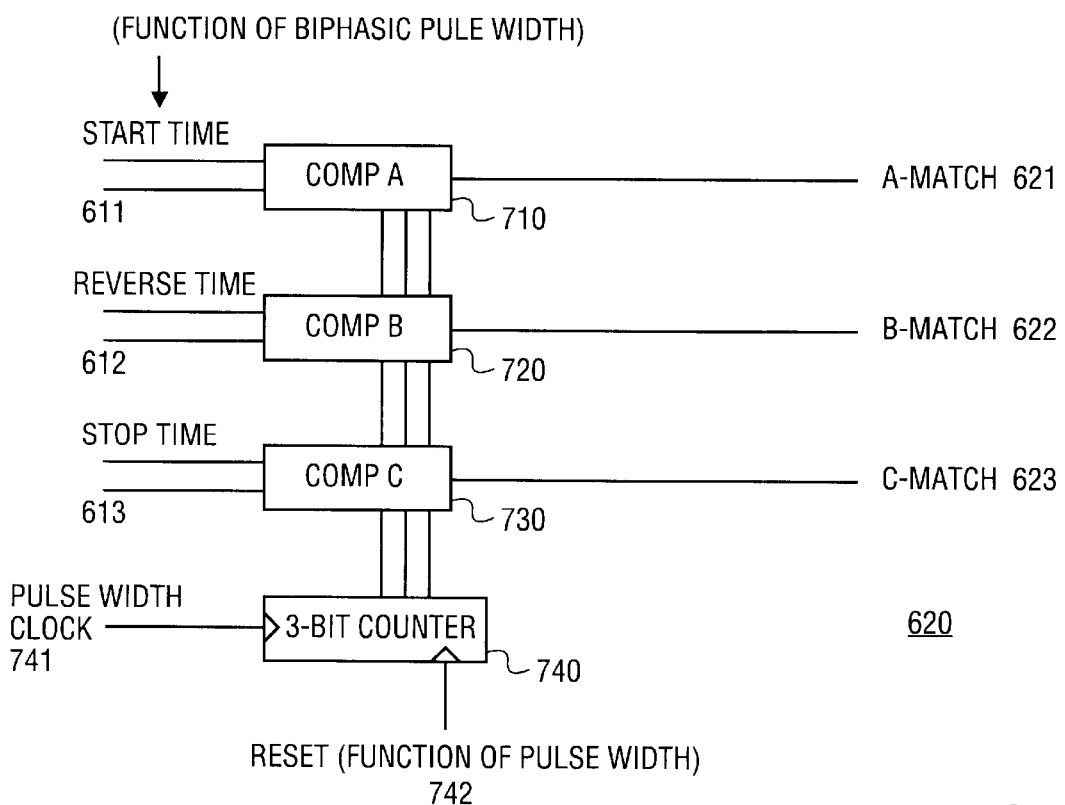
FIG. 7 shows a switch control of the preferred embodiment according to the present invention.

FIG. 7 shows a preferred embodiment of a switch control 620 according to the present invention. The switch control 620 as shown comprises three comparators 710,720,730 and a three-bit counter 740 because a three-bit timing input is used for illustrating this preferred embodiment. Each of the three different timing signals (i.e. start time 611, reverse time 612, and stop time 613) is provided to one corresponding comparator as shown. As described in the previous paragraphs, each of the three timing signals 611,612,613 indicates a voltage transition for a biphasic pulse. In addition, as shown in the figure, the three-bit counter 740 is provided with a pulse width clock 741 and a reset signal 742 for initialization.

In the preferred embodiment as shown, the reset signal 742 is provided to the three-bit counter 740 to signal the beginning of a biphasic pulse. The reset signal 742 is normally set to suspend the incrementation of the three-bit counter 740. When the reset signal 742 is released by a pulse timer (not shown in the figure), the three-bit counter 740 begins counting up starting at "000". It should be noted that the pulse timer is simply a time interval encoder for initializing the generation of the biphasic pulse according to the corresponding time interval encoding.

After the reset signal 742 is released, the three-bit counter 740 provides a three-bit counting signal to each of the three comparators 710,720,730. In this preferred embodiment, the pulse width clock signal 741 is used to clock the three-bit counter 740 so that the counting signal increments at each pulse of the pulse width clock 741.

As shown in the figure, each of the three comparators 710,720,730 is provided with one of the three timing signals (i.e. start time 611, reverse time 612, and stop time 613) and a three-bit counting signal generated by the three-bit counter 742. Thus, each of the three comparators 710,720,730 compares the counting signal with the corresponding one of the three timing signals 611,612,613. When any of the three timing signals 611,612,613 equals to the three-bit counting signal, a corresponding pulse lasting for one clock cycle is generated. In the example as shown, each of the three comparators generates 710,720,730 a corresponding pulse signal (i.e. A-match 621, B-match 622, and C-match 623) at three different time instances for indicating the start time, reverse time, and stop time of the biphasic pulse.

Specifically, in the preferred embodiment as shown, the first comparator (i.e. Comp A 710) is for generating the A-match signal 621 by comparing the start time 611 with the three-bit counting signal. When the start time 611 equals to the three-bit counting signal provided by the three-bit counter 740, the Comp A 710 generates the A-match signal 621. The A-match signal 621 indicates the beginning of a biphasic pulse. The second comparator (i.e. Comp B 720) is for generating the B-match signal 622 by comparing the reverse time 612 with the three-bit counting signal. When the reverse time 621 equals to the three-bit counting signal provided by the three-bit counter 740, the Comp B 720 generates the B-match signal 622. Particularly, the B-match signal 622 indicates the voltage transition of the biphasic pulse from either the low to high, or from the high to low. The third comparator (i.e. Comp C 720) is for generator the C-match signal 623 by comparing the stop time 613 with the three-bit counting signal. When the stop time equals to the three-bit counting signal provided by the three-bit counter 740, the Comp C 720 generates the C-match 623 signal. Particularly, the C-match signal 623 indicates the termination of the biphasic pulse.

Figure 8:
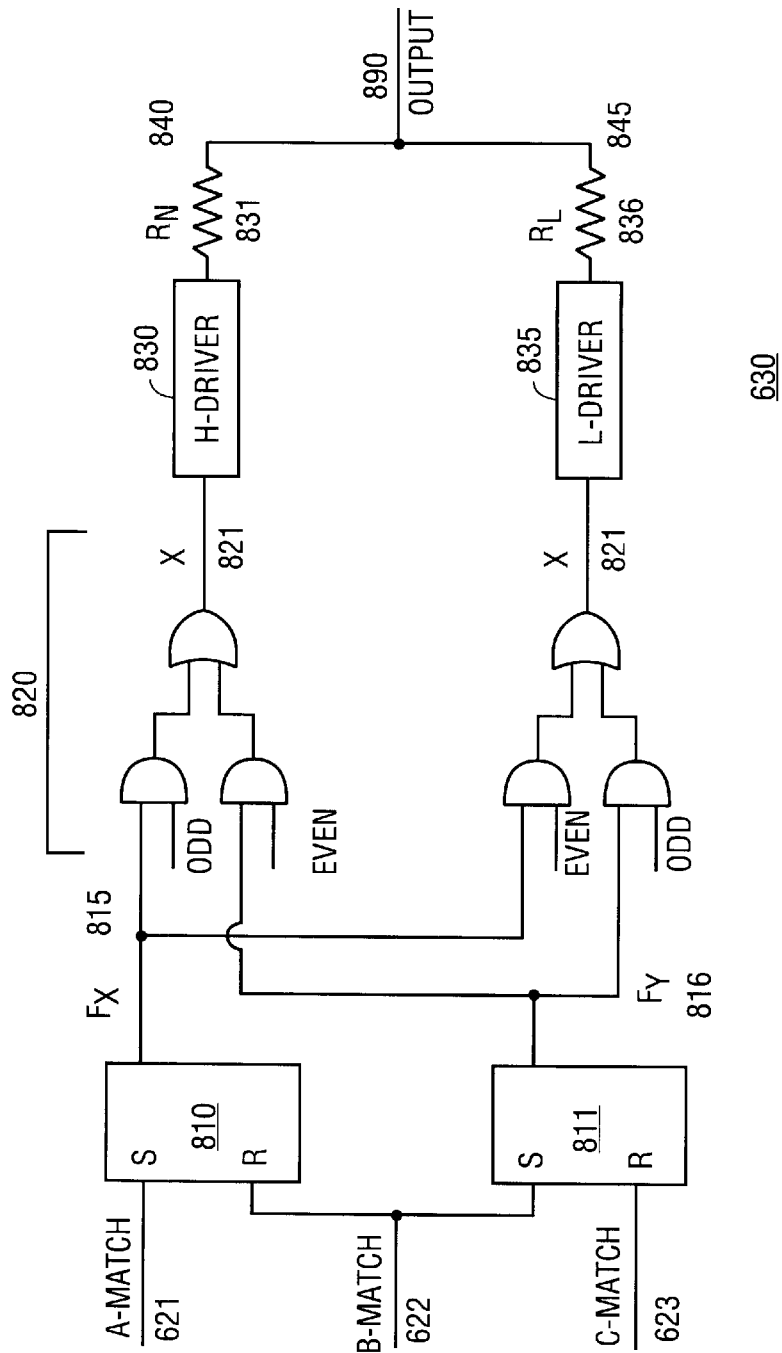
FIG. 8 shows the details of a biphasic pulse generator for implementing the combination of the demarcation of time interval encoding and pulse width encoding method of the encoder as shown in FIG. 6.

FIG. 8 shows the details of a biphasic pulse generator 630 of the encoder as shown in FIG. 6 for producing the biphasic pulse chain using the combination of the demarcation of the time interval encoding and the pulse width encoding method. The pulse generator 630 as shown is provided with the three match signals (A-match 621, B-match 622, and C-match 623) from the three comparators 710,720,730. The set/reset flip-flops 810,811 pair is inputted with the three match signals 621,622,623 as shown in the figure, and generates two controlling signals Fx 815 and Fy 816 for the subsequent logic gates 820. In addition, an odd/even signal is also provided to the logic gates 820 to control the generation of odd or even type of biphasic pulses. In response to the odd/even signal and the two controlling signals Fx 815 and Fy 816 provided by the set/reset flip flops 810,811 pair, the logic gates 820 as shown generate two driver signals X 821 and Y 822. The two driver signals X 821 and Y 822 are provided to a high voltage driver H-driver 830 and a low voltage driver L-driver 835 respectively. In this preferred embodiment, both the high voltage driver H-driver 830 and the low driver L-driver 835 output an inactive voltage (i.e. voltage ground) during the inactive state (i.e. A-match 621, B-match 622, and C-match 623 are low). In response to a high driver signal X, the high voltage driver H-driver 830 generates an output high voltage in the H-output line 831 of 2H. On the other hand, in response to a high driver signal Y, the low voltage driver L-driver 835 generates an output low voltage in the L-output line 836 of negative 2H.

The operations of the pulse generator 820 as shown in FIG. 8 can be summarized as follows:

In response to the three match signals 621,622,623, the flip-flops 810,811 pair generates the two controlling signals Fx 815 and Fy 816. Specifically, the first controlling signal Fx 815 is driven high in the first half of the biphasic pulse (i.e. A-match 621 is high, B-match 622 and C-match 623 are low), whereas the second controlling signal Fy 816 is driven high in the second half of the biphasic pulse (i.e. A-match 621 is low, B-match 622 is high, and C-match 623 is low). These two controlling signals Fx 815 and Fy 816 are then converted to the two driver signals X 821 and Y 822 by the logic gates 820 in response to the odd/even signal. Particularly, when the biphasic pulse is odd, the two driver signals X 821 and Y 822 mirror the two controlling signals Fx 815 and Fy 816 respectively. That is, the driver signals X 821 and Y 822 are identical to the two controlling signals Fx 815 and Fy 816 respectively. On the other hand, when the biphasic pulse is even, the logic gates 820 switch the connection between the two driver signals 821,822 and the two controlling signals 815,816. In this case, the driver signal X 821 is identical to the controlling signal Fy 816, whereas the driver signal Y 822 is identical to the controlling signal Fx 815.

It should be noted again the operations of the two voltage drivers H-driver 830 and L-driver 835. That is, in response to a high driver signal X 821, the high voltage driver H-driver 830 generates an output high voltage in the H-output line 831 of 2H. On the other hand, in response to a high driver signal Y, the low voltage driver L-driver 835 generates an output low voltage in the L-output line 835 of negative 2H.

In the preferred embodiment as shown, the two driving resistors R$_H$ 840 and R$_L$ 845 work together as a voltage divider and these two resistors are chosen in equal value. Therefore, when both the outputs of the two voltage drivers H-driver 835 and L-driver 835 are voltage ground, the output voltage 890 of the pulse generator is voltage ground. When the high output driver H-driver 830 outputs a high voltage (i.e. 2H) and the low output driver L-driver 835 is inactive (i.e. voltage ground output), the output voltage 890 of the pulse generator 630 has is 2H/2=H. On the other hand, when the high output driver H-driver 830 is inactive (i.e. voltage ground output) and the low output driver L-driver 835 outputs a negative high voltage (i.e. negative 2H), the output voltage 890 of the pulse generator has an output voltage of negative 2H/2=negative H. Therefore, the biphasic pulse generated has a high voltage of H, a low voltage of negative H, and an inactive voltage of voltage ground.

It should be noted that the output voltages of the two drivers (i.e. H-driver 830 and L-driver 835) can be adjusted to accommodate any voltage requirements in the transmission line. For example, in order to maintain zero dc component in the transmission line, the high voltage generated by the H-driver 830 can be higher than the negative high (i.e. negative high) voltage generated by the L-driver 835 in order to compensate any differences in their respective time in the active period. In addition, the present invention is not limited to any specific high and low voltage levels.

Figure 9:
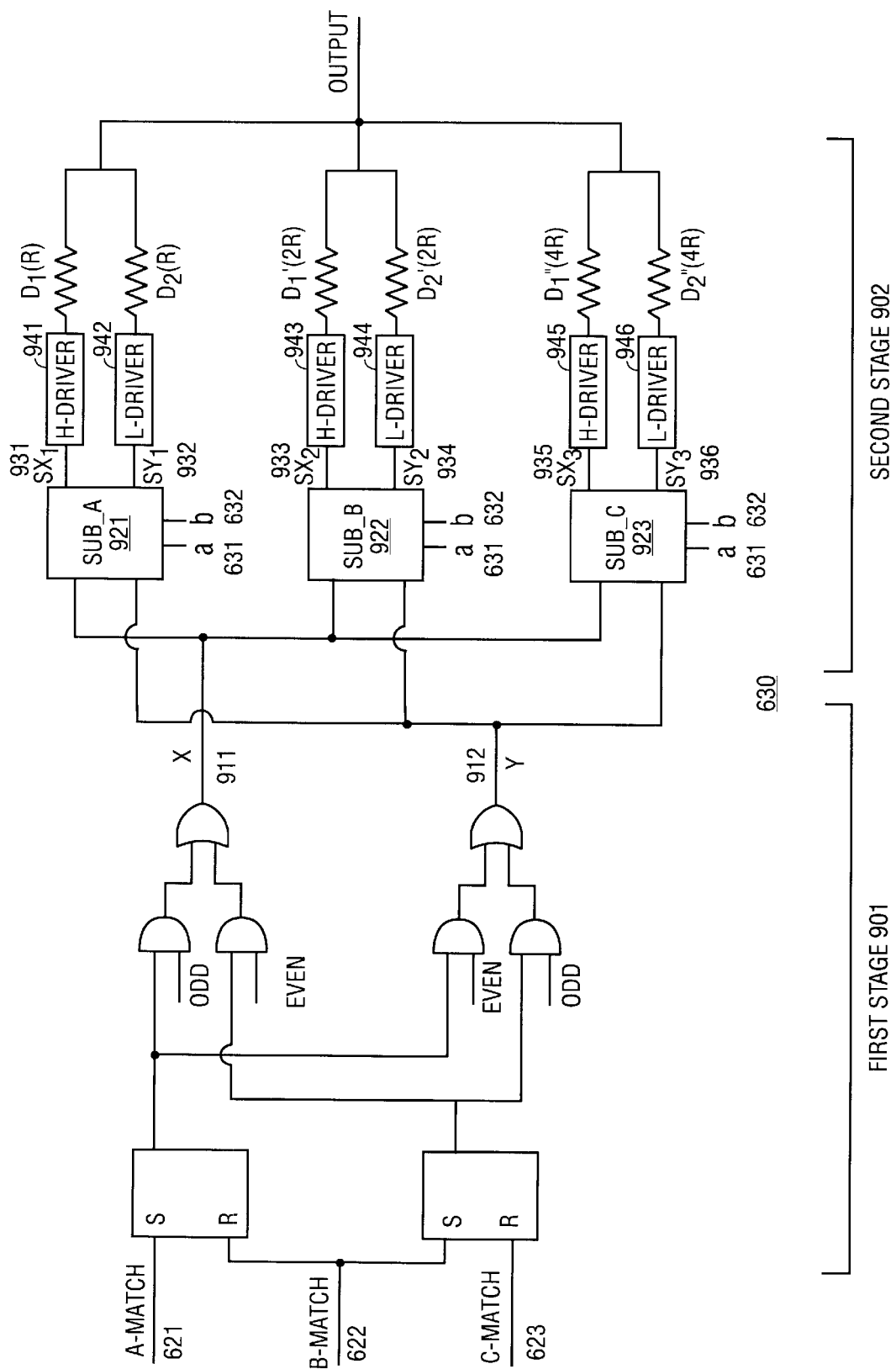
FIG. 9 shows the details of a biphasic pulse generator for implementing the combination of the demarcation of time interval encoding and amplitude encoding method of the encoder as shown in FIG. 6.

FIG. 9 shows a biphasic pulse generator 630 for the combination of the demarcation of time interval encoding and the amplitude encoding of the encoder as shown in FIG. 6. The pulse generator as shown comprises a first stage 901 and a second stage 902. The first stage 901 is similar to the pulse generator as shown in FIG. 8 for the combination of the demarcation of timer interval encoding and the pulse width encoding so that the first stage of the pulse generator is provided with the three pulse signals (i.e. A-match 621, B-match 622, and C-match 623) and the odd/even signal. Upon receiving the three match signals 621,622,623, two driving signals X 911 and Y 912 are produced for driving a second stage 902 of the pulse generator 630. The second stage 902 generates a corresponding voltage level in response to the amplitude control inputs a 631 and b 632. These two amplitude control inputs a 631 and b 632 are produced by an amplitude control circuit (not shown) for encoding binary data with the amplitude of each biphasic pulse.

As shown in the figure, the second stage 902 comprises three subcircuits (i.e. subcircuit SUB_A 921, subcircuit SUB_B 922, and subcircuit SUB_C 923), and the details of the three subcircuits are shown in FIG. 10. Each of the three subcircuits 921,922,923 outputs two sub-driver signals SX$_1$ 931/SY$_1$ 932, SX$_2$ 933/SY$_2$ 934, and SX$_3$ 935/SY$_3$ 936. As shown in the figure, each of these three pairs of sub-driver signals is provided to a high voltage driver and a low voltage driver pair (i.e. H-driver 941,943,945, L-driver 942,944, 946). The operation of each of the high voltage driver H-driver 941,943,945 and the low voltage driver L-driver 942,944,946 is explained in detail in the previous paragraphs. Furthermore, the outputs of these three driver pairs are provided to three resistor pairs D$_1$/D$_2$, D$_1$'/D$_2$", D$_1$"/D$_2$" respectively. In this embodiment as shown, the three resistors pairs D$_1$/D$_2$, D$_1$'/D$_2$", D$_1$"/D$_2$" in combination works as a voltage divider so that the amplitude of each biphasic pulse generated is divided into four levels (i.e. H, 3H/4, 2H/4, and H/4). By dividing the amplitude of each biphasic pulse into four levels, two data bits can be encoded in each biphasic pulse.

As discussed in the previous paragraphs, the detail operation of the first stage 901 of the pulse generator as shown is similar to the operation of the pulse generator as shown in FIG. 8 (but without the two voltage drivers and the two driving resistors). In response to the three match signals 621,622,623 and the odd/even signal, the first stage 901 of the pulse generator generates the two control signals X 911 and Y 912 accordingly. Specifically, for an odd type biphasic pulse, the control signal X 911 is raised high during the first half of the biphasic pulse. On the other hand, for an even type biphasic pulse, the control signal Y 912 is raised high during the second half of the biphasic pulse.

The second stage 902 of the pulse generator as shown operates as three separate voltage dividers. The three sub-driver signals pairs $SX_1$ 931/$SY_1$ 932, $SX_2$ 933/$SY_2$ 934, and $SX_3$ 935/$SY_3$ 936 are generated by the three subcircuits SUB_A 921, SUB_B 922, and SUB_C 923 so that each resistors pairs D1/D2, D1'/D2', or D1"/D2" are activated in response to the amplitude control signals (i.e. a 631 and b 632). Details of the three subcircuits SUB_A 921, SUB_B 922 and SUB_C 923 are illustrated in FIG. 10. By controlling the two amplitude control signals (a 631 and b 632), four different voltage levels (i.e. H, 3H/4, 2H/4, and H/4 for positive pulse, and –H, –3H/4, –2H/4, and –H/4 for negative pulse) can be defined for each positive pulse and negative pulse. It should be noted that, since each of the resistor pairs D1/D2, D1'/D2', or D1"/D2" work as a voltage divider for generating the appropriate voltage level for the output, the resistance values of all three resistor pairs are chosen so that the four different voltage levels can be obtained. In the preferred embodiment as shown, each of the resistors D1,D2 has a resistance value of R. Each of the resistors D1',D2' has a resistance value of 2R. And each of the resistors D1",D2" has a resistance value of 4R.

The following operation illustrates the generation of the first half of an odd type biphasic pulse. If the two amplitude control signals a 631 and b 632 are both high, all three sub-driver signals $SX_1$ 931, $SX_2$ 933, and $SX_3$ 935 are driven high so that the output is raised to the highest voltage. If the amplitude control signal a 631 is high and the amplitude control signal b 632 is low, the sub-driver signals $SX_1$ 931 and $SX_2$ 933 are driven high while the sub-driver signal $SX_3$ 935 is driven low. In this case, the output voltage is raised to a second highest level. If the amplitude control signal a 631 is low and the amplitude control signal b 632 is high, the sub-driver signals $SX_1$ 931 and $SX_3$ 935 are then driven high while the sub-driver signals $SX_2$ 933 is driven low. In this case, the output voltage is raised to a third highest level. Finally, if both the amplitude control signals a 631 and b 632 are low, only the sub-driver signal $SX_1$ 931 is driven high. In this case, the output voltage is raised to a lowest high level.

Figure 11:
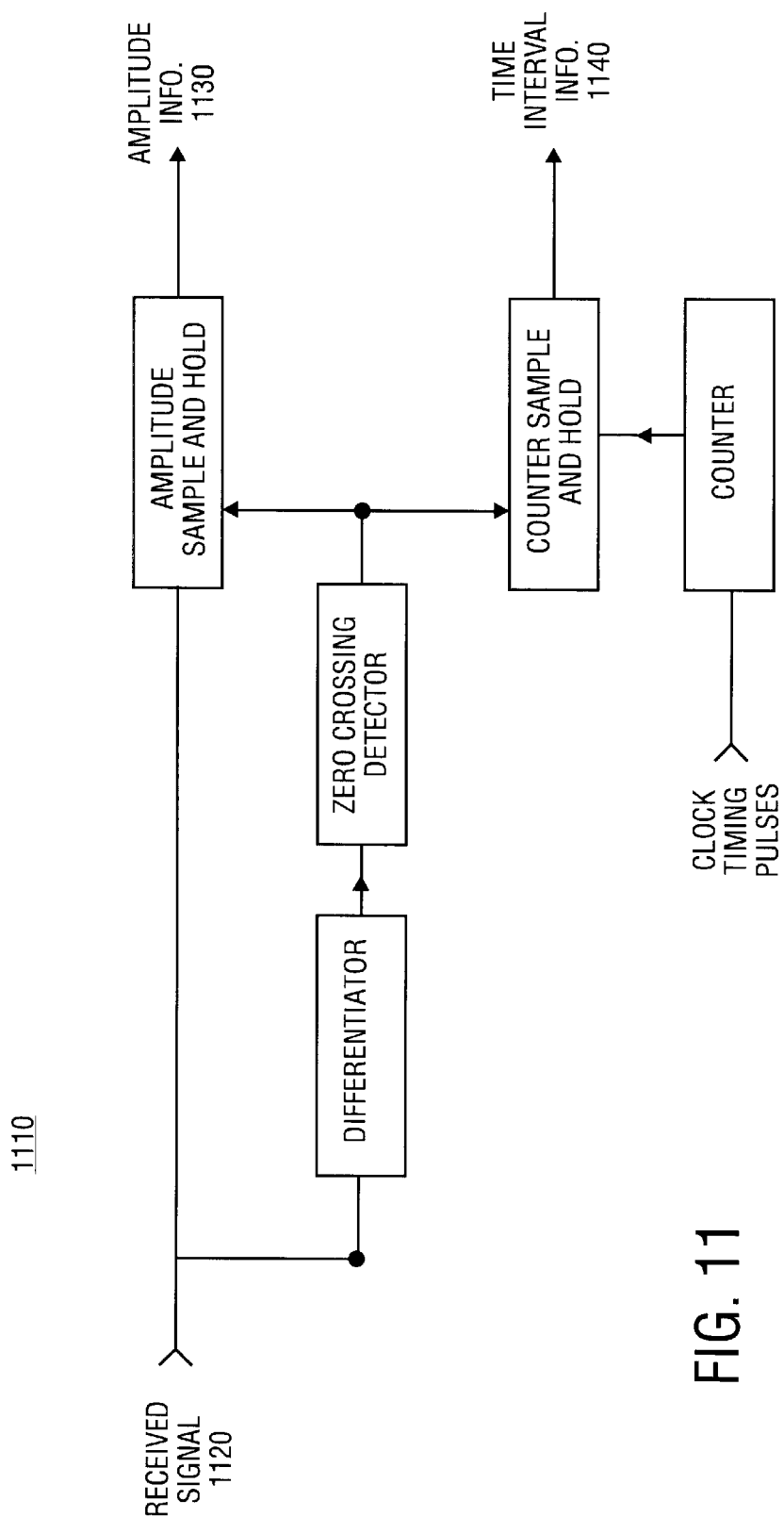
FIG. 11 shows a preferred embodiment of a receiver for receiving and decoding data received according to the present invention.

FIG. 11 shows a receiver 1110 of a preferred embodiment for receiving and decoding the received data according to the present invention. The receiver 1110 as shown measures the time interval between each pair of opposite polarity peaks and the amplitude of each peak in voltage. As shown in FIG. 11, the received signal 1120 is first provided to the receiver for decoding. The receiver 1110 generates two outputs: the first output is the amplitude information 1130 of each pulse received, and the second output is the time interval information 1140 between each of two consecutive pulses received. Using these two output signals 1130,1140, the encoded data can be recovered. It should be noted that the receiver can be constructed with analog circuits or with digital signal processing circuits, or a combination of them. And other techniques of measuring the time interval between consecutive pulses and the amplitude of each pulse are also known in the art and will not be discussed in detail.

For example, under normal conditions, the signals received on the receiving end of a Build Out are illustrated as waveform (c) of FIG. 1 and waveform (e) of FIG. 5. Since each marking signal is separated by a time interval, data encoded by the demarcation of time interval encoding method can then be recovered by measuring the time interval between consecutive voltage peaks. Furthermore, data encoded by the amplitude or pulse width encoding method can be recovered by determining the amplitude of each pulse received to recover the data encoded by either encoding method (i.e. amplitude or pulse width).

FIGS. 12–15 illustrate the generation of four different biphasic pulses having four different pulse widths using the encoder as shown in FIG. 6.

Figure 12:
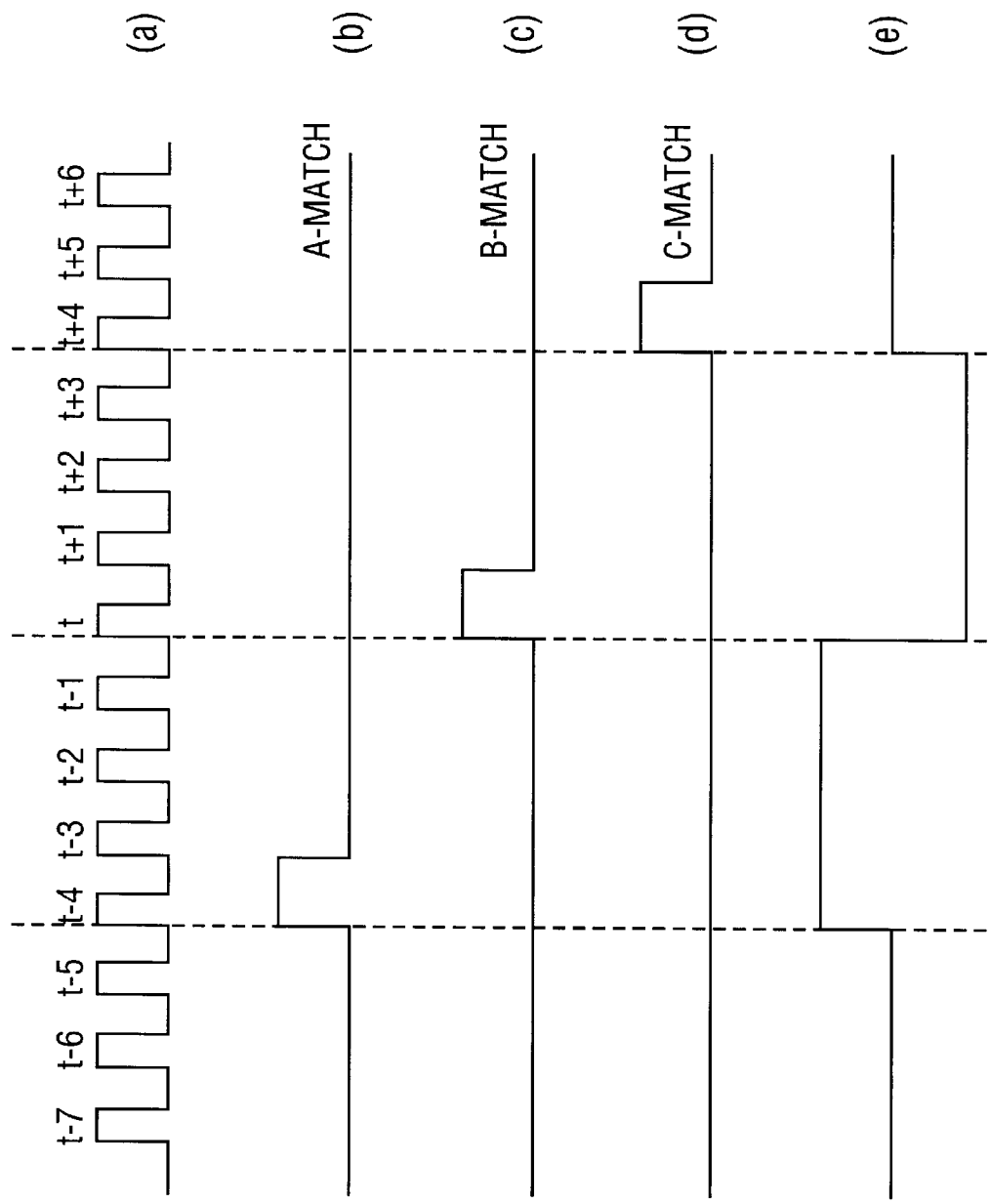
FIGS. 12–15 illustrate the generation of four different biphasic pulses having four different pulse widths using the encoder as shown in FIG. 6.

FIG. 12 shows the generation of a biphasic pulse having a pulse width of 8 units. As shown in FIG. 12, waveform (a) is the waveform of the pulse width clock signal provided to the three-bit counter. Waveform (b) shows the A-match 621 signal generated by the comparator Comp A 710. As stated in the previous paragraphs, the A-match 621 signal indicates the beginning of a biphasic pulse. Waveform (c) shows the B-match 622 signal generated by the comparator Comp B 720 for indicating the reverse time of the biphasic pulse. Waveform (d) shows the C-match 623 signal generated by the comparator for indicating the stop time of the biphasic pulse. Finally, waveform (e) shows the biphasic pulse generated by the pulse generator using these three match signals. Thus, as shown in the figure, the pulse width of the biphasic pulse is 8 units.

Figure 13:
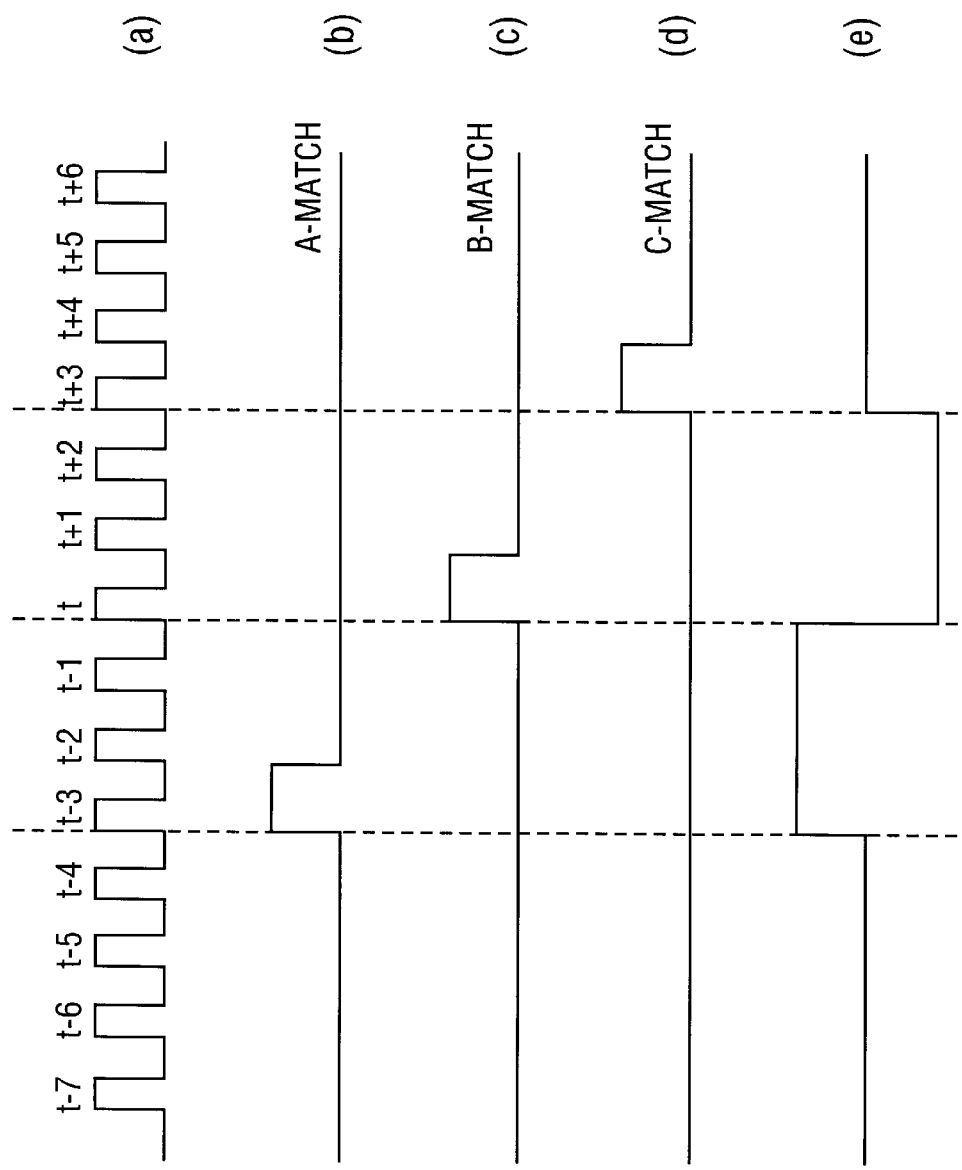

FIG. 13 shows the generation of a biphasic pulse having a pulse width of 6 units. Similar to FIG. 12, waveforms (b), (c), and (d) show the three match signals (i.e. A-match 621, B-match 622, and C-match 623) accordingly. Waveform (e) is the biphasic pulse generated by the pulse generator by using these three match signals. As shown in the figure, the pulse width of the biphasic pulse generated is 6 units.

Figure 14:
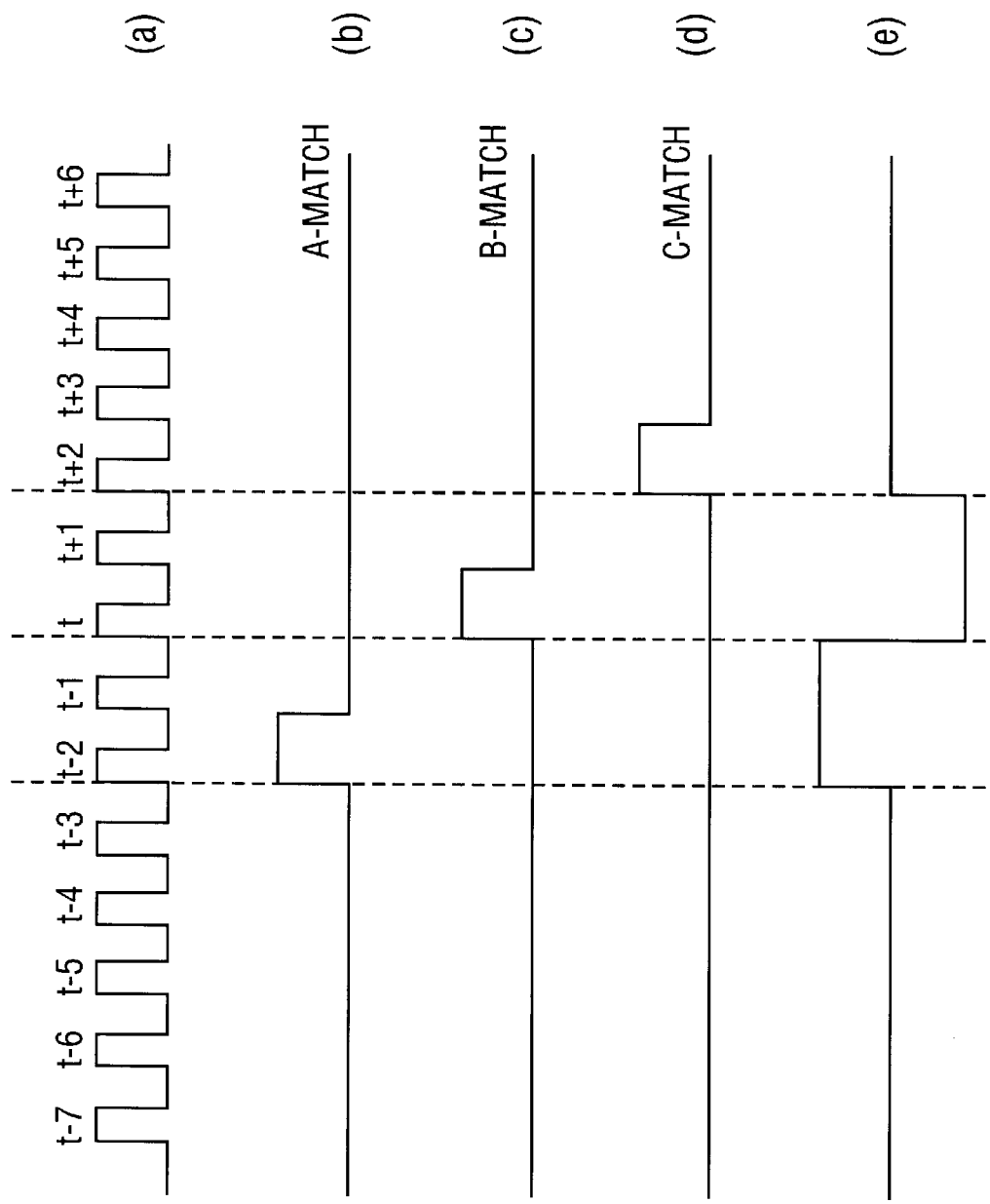

FIG. 14 shows the generation of a biphasic pulse having a pulse width of 4 units. Similar to FIG. 12, waveforms (b), (c), and (d) show the three match signals (i.e. A-match 621, B-match 622 and C-match 623) accordingly. Waveform (e) is the biphasic pulse generated by the pulse generator by using these three match signals. As shown in the figure, the pulse width of the biphasic pulse generated is 4 units.

Figure 15:
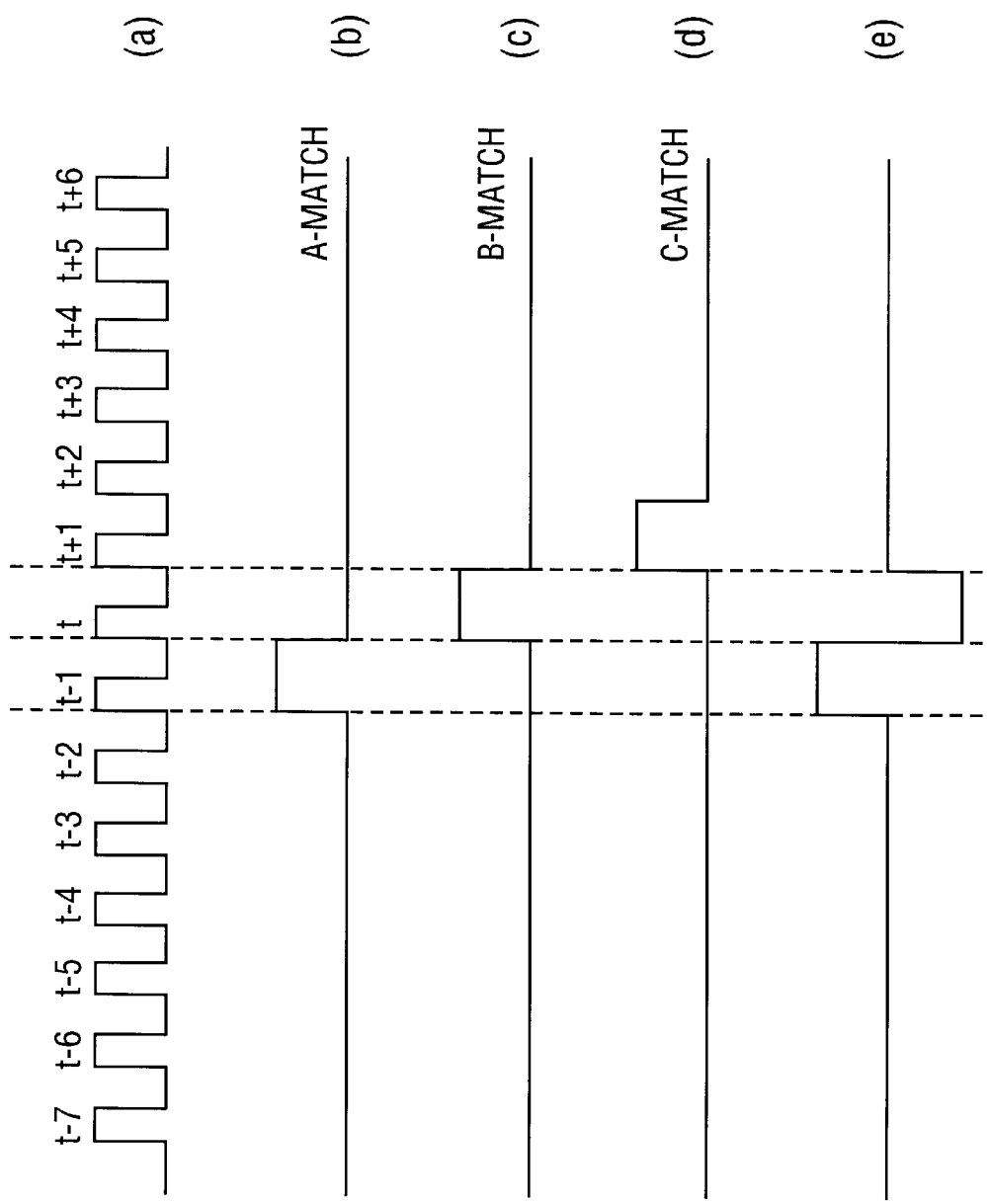

FIG. 15 shows the generation of a biphasic pulse having a pulse width of 2 units. Similar to FIG. 12, waveforms (b), (c), and (d) show the three match signals (i.e. A-match 621, B-match 622 and C-match 623) accordingly. Waveform (e) is the biphasic pulse generated by the pulse generator by using these three match signals. As shown in the figure, the pulse width of the biphasic pulse generated is 2 units.

Another aspect of the present invention is to implement the data encoding system as discussed along with FIGS. 1–4 in the magnetic recording area. As shown in FIGS. 1–4, data is encoded using successive biphasic pulses transmitted through a communication medium. Each of the biphasic pulses begins with a voltage transition from a reference voltage to a high/low state (e.g. high for even pulse; low for odd pulse). After a predetermined time interval, another voltage transition occurs from the high/low state to the low/high state (i.e. low for even pulse; high for odd pulse). After another predetermined time interval, the signal returns to the reference voltage at the end of the biphasic pulse. As discussed in the previous sections, data can be encoded in the time interval between successive biphasic pulses and also in the pulse width in each biphasic pulse.

In the magnetic recording area, data is stored in different storage medium such as magnetic tapes and magnetic disks. For example, in order to record data in a magnetic tape, the magnetic tape is divided into a plurality of consecutive small sections. Each section of the magnetic tape can be magnetically polarized in one of the two magnetic states (i.e. positive saturation and negative saturation). The magnetic polarization can be either performed longitudinally or perpendicularly. In addition, polarized magnetic sections can be returned to a neutral and unpolarized state by going through an erasure procedure.

Thus, according to this aspect of the present invention, digital data is recorded in a magnetic medium using an encoding scheme similar to the encoding method as shown in FIGS. 1–4. According to this aspect of the present invention, the high voltage state used in the encoding method as shown in FIGS. 1–4 is represented by recording one of the two magnetic states in a small section of the magnetic medium. Then, the negative voltage used in the encoding scheme as shown in FIGS. 1–4 is represented by recording the other magnetic state in the magnetic medium. For example, assuming the high voltage used in FIGS. 1–4 is represented by the positive magnetic saturation state, the low voltage is then represented by the negative magnetic saturation state. Furthermore, the reference voltage used in the encoding method as shown FIGS. 1–4 is represented by returning the magnetic medium to an unpolarized magnetic state.

Figure 16:
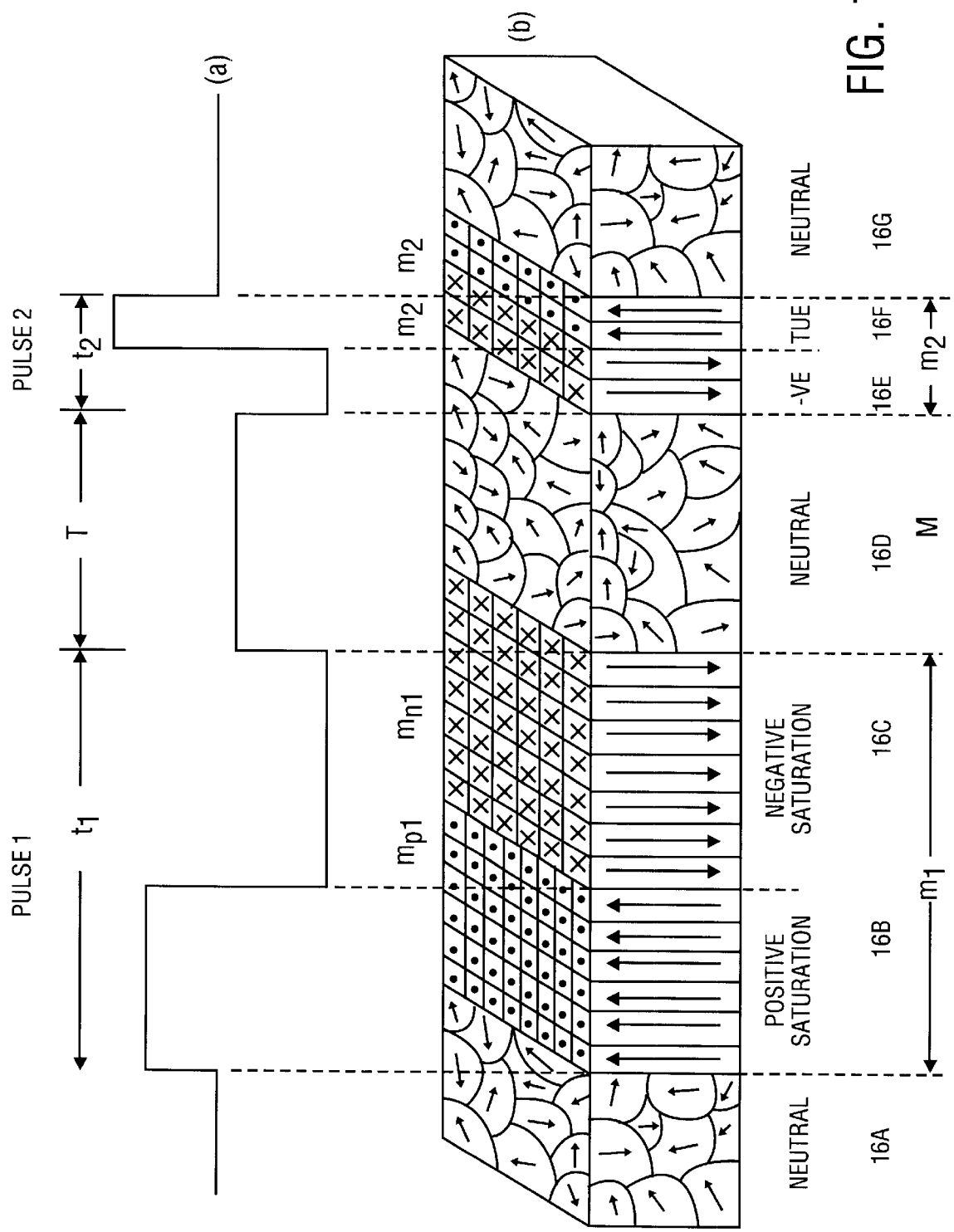
FIG. 16(a) is a timing diagram showing a sequence of encoded digital data bits using the encoding method as discussed with FIGS. 1–4.
FIG. 16(b) shows a strip of magnetic media encoded with the same sequence of data bits as in FIG. 16(a) according to one aspect of the present invention.

FIG. 16(a) is a timing diagram showing a sequence of encoded digital data bits using the encoding method as discussed with FIGS. 1–4. The example as shown comprises two biphasic pulses (i.e. pulse 1 and pulse 2). In this example, data is encoded in the width of each of the two biphasic pulses (i.e. t1, t2) and the time interval between the pulse 1 and the pulse 2 (i.e. time interval T).

FIG. 16(b) shows a strip of magnetic media encoded with the same sequence of data bits as in FIG. 16(a) using this aspect of the present invention. As shown in the figure, the high voltage as shown in FIG. 16(a) is represented by a positive magnetic saturation 16b, 16f recorded in the magnetic strip, whereas the low voltage as shown in FIG. 16(a) is represented by a negative magnetic saturation 16c, 16e recorded in the magnetic strip. Furthermore, the reference voltage as shown in FIG. 16(a) is represented by a neutral magnetic state 16a, 16d, 16g in the magnetic strip. Thus, according to this example, the first pulse width t1 can be recovered from the magnetic strip by determining the length of the first positive magnetic saturation $m_{p1}$ plus the length of the first negative magnetic saturation $m_{n1}$. Similarly, the second pulse width t2 can be recovered from the magnetic strip by determining the length of the second negative saturation $m_{n2}$ plus the length of the second positive magnetic saturation $m_{p2}$. In addition, the time interval T is represented by determining the length of the magnetic neutral portion M.

It should be noted that the magnetic encoding method shown in FIG. 16(b) employs an alternate mark inversion ("AMI") encoding method. However, this aspect of the present invention is not limited to the AMI only. That is, each of the biphasic magnetic pulses recorded in the magnetic medium can either be in the same type or in the opposite types as discussed in the AMI.

Furthermore, it should be noted that the recording to these three magnetic states (i.e. positive saturation, negative saturation, and neutral state) in the magnetic media is known in one skilled in the art. For example, by operating a combination of a recording head and an erase head, each of the three magnetic states (i.e. positive saturation, negative saturation, and magnetic neutral) can be realized accordingly. For example, detail descriptions on magnetic heads are discussed in pp. 197–224 of The Complete Handbook of Magnetic Recording, 4th Edition, by Finn Jorgensen, and are hereby incorporated by reference. In addition, detail descriptions on the writing and reading processes from magnetic are disclosed in pp. 31–55 of Introduction to Magnetic Recording, edited by Robert M. White, and are hereby incorporated by reference. Furthermore, a brief description on the current recording method is siclosed in pp. 57–71 of Introduction to Magnetic Recording, edited by Robert M. White, and are hereby incorporated by reference.

It is to be understood that while the invention has been described above in conjunction with preferred specific embodiments, the description and examples are intended to illustrate and not limit the scope of the invention, which is defined by the scope of the appended claims.

What is claimed is:

1. A method for storing a sequence of data bits on a magnetic medium using biphasic magnetic pulses, wherein each biphasic magnetic pulse comprises a first magnetic state and a second magnetic state, comprising:

recording a first biphasic magnetic pulse on said magnetic medium at a first magnetic location; and recording a second biphasic magnetic pulse on said magnetic medium at a second magnetic location, wherein said first magnetic location and second magnetic location is separated by a plurality of different lengths;

wherein each of said different lengths between said second magnetic location and said first magnetic location represents at least two data bits.

2. The method according to claim 1, wherein said biphasic magnetic pulses comprise even and odd type, and wherein said first biphasic magnetic pulse and the second magnetic biphasic pulse are different types.

3. The method according to claim 1, wherein said first magnetic state is a positive saturation state, and said second magnetic state is a negative saturation state, and said magnetic medium is in a magnetic neutral state between said first biphasic magnetic pulse and said second biphasic magnetic pulse.

4. The method according to claim 1, wherein said first magnetic state is a negative saturation state, and said second magnetic state is a positive saturation state, and said magnetic medium is in magnetic neutral state between said first biphasic magnetic pulse and said second biphasic magnetic pulse.

5. The method according to claim 1, wherein each of the biphasic magnetic pulse has a pulse width.

6. The method according to claim 5, wherein said different lengths between said biphasic magnetic pulses represents a first set of data bits and, wherein the pulse width of each biphasic magnetic pulse represents a second set of data bits, said second set of data bits comprising at least one data bit.

7. The method according to claim 1, wherein said magnetic medium is a computer disk.

8. The method according to claim 1, wherein said magnetic medium is a computer tape.

9. A method of storing a sequence of data bits in a magnetic medium comprising:

storing a sequence of biphasic magnetic pulses in said magnetic medium, wherein each biphasic magnetic pulse comprises a first magnetic state and a second magnetic state, and wherein each two consecutive biphasic magnetic pulses are separated by a plurality of different lengths, wherein each of the lengths between two consecutive biphasic magnetic pulses represents at least two data bits.

10. The method according to claim 9, wherein said biphasic magnetic pulses comprise even and odd type, and wherein each neighboring biphasic magnetic pulses are different types.

11. The method according to claim 9, wherein said first magnetic state is a positive saturation state, and said second magnetic state is a negative saturation state, and said magnetic medium is in a magnetic neutral state between each two consecutive biphasic magnetic pulses.

12. The method according to claim 9, wherein said first magnetic state is a negative saturation state, and said second magnetic state is a positive saturation state, and said magnetic medium is in a magnetic neutral state between each two consecutive biphasic magnetic pulses.

13. The method according to claim 9, wherein each of said biphasic magnetic pulses has a pulse width.

14. The method according to claim 13, wherein said different lengths between said biphasic magnetic pulses represents a first set of data bits, wherein the pulse width of each biphasic magnetic pulse represents a second set of data bits, said second set of data bits comprising at least one data bit.

* * * * *